United States Patent
Ivanova et al.

(10) Patent No.: US 9,686,637 B2
(45) Date of Patent: Jun. 20, 2017

(54) METHOD OF AND SYSTEM FOR PAIRING A BLUETOOTH MASTER DEVICE WITH A BLUETOOTH SLAVE DEVICE THAT IS SELECTED FROM A GROUP OF BLUETOOTH SLAVE DEVICES THAT ARE IN BLUETOOTH-DISCOVERABLE RANGE WITH THE BLUETOOTH MASTER DEVICE

(71) Applicant: SYMBOL TECHNOLOGIES, LLC, Lincolnshire, IL (US)

(72) Inventors: Ekaterina Sergeyevna Ivanova, St. Petersburg (RU); Dmitry Vladimirovich Bibin, St. Petersburg (RU); Robert J. Pang, Williston Park, NY (US); Oleg Gennadievich Poukha, St. Petersburgh (RU); Ilya Borisovich Pozdnov, St. Petersburg (RU); Mariya Wright, Cortlandt Manor, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/032,497

(22) PCT Filed: Dec. 13, 2013

(86) PCT No.: PCT/RU2013/001124
§ 371 (c)(1),
(2) Date: Apr. 27, 2016

(87) PCT Pub. No.: WO2015/088377
PCT Pub. Date: Jun. 18, 2015

(65) Prior Publication Data
US 2016/0277875 A1    Sep. 22, 2016

(51) Int. Cl.
*H04W 4/00*    (2009.01)
*H04W 4/20*    (2009.01)
*H04W 76/02*    (2009.01)

(52) U.S. Cl.
CPC .......... *H04W 4/008* (2013.01); *H04W 4/206* (2013.01); *H04W 76/023* (2013.01)

(58) Field of Classification Search
CPC ...................................... H04W 4/008
See application file for complete search history.

(56) References Cited

U.S. PATENT DOCUMENTS

| 8,666,313 B2 * | 3/2014 | Preston ................. H04L 63/18 370/310 |
| 2003/0065918 A1 | 4/2003 | Willey |

(Continued)

FOREIGN PATENT DOCUMENTS

EP    2506536 A1    10/2012

OTHER PUBLICATIONS

Bluetooth Special Interest Group: "Bluetooth Human Interface Device (HID) Profile Specifications," Bluetooth Adopted Specification web page, Feb. 21, 2012, pp. 1-123 [retrieved from Internet: https://www.bluetooth.org/en-us/specification/adopted-specifications] retrieved on Aug. 7, 2014.

(Continued)

*Primary Examiner* — Tuan H Nguyen

(57) ABSTRACT

A Bluetooth master device is paired with a Bluetooth slave device that is selected from a group of Bluetooth slave devices that are in Bluetooth-discoverable range with the Bluetooth master device. The master device establishes with the slave devices unauthenticated communications, each containing a Bluetooth device address of the master device. The slave devices receive from the master device the Bluetooth device address. The selected slave device recognizes a manual action manually performed with the selected slave device by a user. The selected slave device initiates a pairing request, in response to recognition of the manual action, and communicates with the master device at the received Bluetooth device address.

8 Claims, 3 Drawing Sheets

(56) References Cited

U.S. PATENT DOCUMENTS

| | | |
|---|---|---|
| 2006/0105712 A1 | 5/2006 | Glass et al. |
| 2010/0043056 A1* | 2/2010 | Ganapathy ............ H04W 12/06 726/2 |
| 2011/0247056 A1 | 10/2011 | Lee |
| 2012/0284449 A1 | 11/2012 | Tung et al. |
| 2013/0029596 A1 | 1/2013 | Preston et al. |

OTHER PUBLICATIONS

"CipherConnect connection instructions to a BlackBerry device," Dec. 31, 2011 [retrieved from Internet: http://connect.cipherlab.com/file/CipherConnect_BlackBerry_v1.03.pdf] retrieved on Aug. 5, 2014.

Jiang, "Core ICS Values declaration for a Bluetooth Barcode Scanner by Cipherlab Co., Ltd.," Bluetooth SIG—Official Product Listing site, Jan. 19, 2012 [retrieved from Internet: https://www.bluetooth.org/tpg/showCorePICS.cfm?3A000A5A005C504C-565B5014403B0C0D0E240502241030105E7503F202A5A7159-544653] retrieved on Aug. 5, 2014.

Ranta et al., "Human Interface Device (HID) Profile Version 1.0 adopted," May 22, 2003, pp. 1-123 [retrieved from Internet: https://webcache.googleusercontent.com/search?q=cache:o4AofmJ2PqAJ:https://www.bluetooth.org/docman/handlers/DownloadDoc.ashx%3Fdoc_id%3D7108+&cd=1&hl=en&ct=clnk&gl=us].

International Search Report and Written Opinion from corresponding International Patent Application No. PCT/RU2013/001124 dated Aug. 22, 2014.

\* cited by examiner

METHOD OF AND SYSTEM FOR PAIRING A BLUETOOTH MASTER DEVICE WITH A BLUETOOTH SLAVE DEVICE THAT IS SELECTED FROM A GROUP OF BLUETOOTH SLAVE DEVICES THAT ARE IN BLUETOOTH-DISCOVERABLE RANGE WITH THE BLUETOOTH MASTER DEVICE

FIELD OF THE DISCLOSURE

The present disclosure relates generally to a method of, and a system for, pairing a Bluetooth master device with a Bluetooth slave device that is selected from a group of Bluetooth slave devices that are in Bluetooth-discoverable range with the Bluetooth master device and, more particularly, to improving the user experience in performing such pairing.

BACKGROUND

Bluetooth is a well-known wireless technology standard for exchanging data over relatively short distances using radio waves in the industrial, scientific and medical (ISM) band from 2400-2480 MHz between wireless devices, such as computers, bar code scanners, telephones, tablets, personal digital assistants, radios, media players, headsets, laptops, computer mice, printers, modems, watches, pairs of glasses, and like mobile devices. Each such Bluetooth-enabled device has a host central processing unit (CPU) in which an operating system, e.g., Windows (trademark), is implemented. The operating system is typically embedded with a software-implemented, Bluetooth stack that supports various native Bluetooth profiles, e.g., PAN, SPP, DUN, HID, HCRP, etc., or Bluetooth versions, e.g., Version 1.0, Version 2.0, Version 3.0 (high-speed), or Version 4.0 (low-energy). These Bluetooth profiles include settings to parameterize and control the behavior that the Bluetooth-enabled devices use to communicate with one another. These Bluetooth versions include specifications regarding data rate and maximum data throughput. Each such Bluetooth-enabled device also has a hardware-implemented Bluetooth microprocessor or controller that is discrete from, or integrated with, the host CPU. The Bluetooth controller is connected to an antenna to transmit or receive the radio waves. As used herein, a Bluetooth device is one that has such a Bluetooth controller.

For security reasons, Bluetooth uses a process called pairing to control communications between a master device and a slave device that is in a Bluetooth-discoverable range of the master device. During pairing, the master and slave devices establish a relationship, typically by creating a shared secret, also known as a link key, which is stored on, and/or shared by, both devices. Once the master and slave devices have been successfully paired, these two devices can automatically connect to each other in the future without requiring the pairing to be repeated in order to confirm the identity of the devices.

When there is only one slave device in the Bluetooth-discoverable range of the master device, the user experience in performing pairing is relatively simple, straightforward, and quick. A user initiates the pairing at the master device, typically by requesting that the master device add the slave device. When the master device recognizes the single slave device, the pairing is complete. However, the user experience is much different when many slave devices are in the Bluetooth-discoverable range of the master device. There are many circumstances where multiple, and even a multitude of, slave devices are within the Bluetooth-discoverable range of a single master device. For example, dozens or hundreds of Bluetooth bar code scanners may be in the Bluetooth-discoverable range at a retail store, a warehouse, a factory, a hospital, or a like facility, where customers/workers remove the scanners from charging stations, and use the scanners when shopping/working to electro-optically read bar codes on various items. As another example, dozens or hundreds of Bluetooth radios or headsets may be in the Bluetooth-discoverable range of a master device, where the radios/headsets are used by first responders as part of a public safety network.

When there are many slave devices in the range of a master device, the user experience in performing pairing is relatively cumbersome, complex and slow. In a typical scenario, a user initiates the pairing by manually starting the Bluetooth discovery process on the master device, e.g., a computer, and by waiting until all the slave devices within range of the master device have been discovered and their identities displayed on a display screen of the master device. Typically, the names of the slave devices are displayed. Some of the names might be the same, thereby leading to confusion in distinguishing among the slave devices. In the case of bar code scanners, their names are represented by multi-digit, serial numbers. It generally takes a few seconds to display each name/serial number, and the user must wait for all the names/serial numbers for the many slave devices to be displayed. The greater the number of slave devices, the longer is the wait.

Next, the user has to find the name/serial number of a target slave device that the user selected and wishes to use. In the case of bar code scanners, the serial number is typically printed in a small font on a label on the target scanner and is typically twelve digits long. Seeing, memorizing, or writing a small-sized, multi-digit, serial number can be a difficult chore for many users. Next, the user has to find the name/serial number of the target slave device amid all the names/serial numbers displayed on the screen of the master device. Then, once the user finds the matching displayed name/serial number, the user has to manually perform another action on the master device to cause the latter to pair to the target slave device. If the user chooses the wrong displayed name/serial number, then the entire pairing process has to be repeated. It will be readily understood that this pairing process is complicated and prone to errors, even by skilled users. For novice users, especially retail customers who wish to use scanners during shopping, this cumbersome pairing process often causes customer frustration and an unwillingness to even use the scanners.

Accordingly, there is a need to enhance the user experience, for both skilled and novice users, when performing pairing in an environment where there are many slave devices in Bluetooth-discoverable range of a master device by simplifying and expediting the pairing process, and by rendering the pairing process more convenient and less prone to errors.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
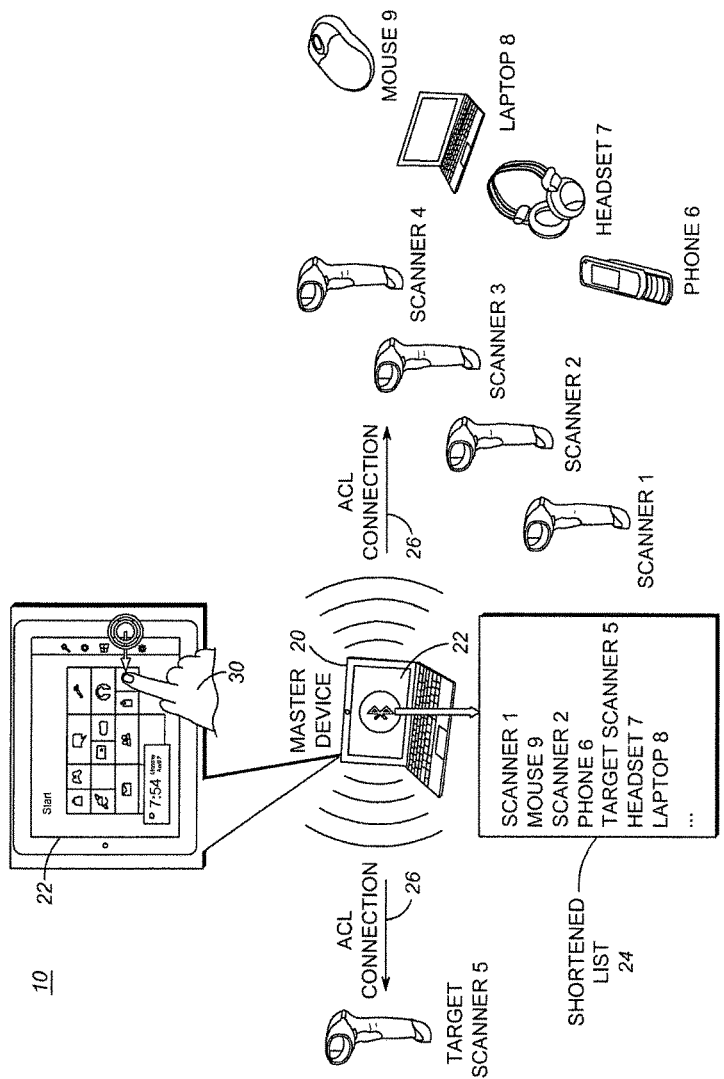
FIG. 1 is a diagrammatic view of a system for pairing a Bluetooth master device with a Bluetooth slave device that is selected from a group of Bluetooth slave devices that are in Bluetooth-discoverable range with the Bluetooth master device in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of pairing a Bluetooth master device with a Bluetooth slave device that is selected from a group of Bluetooth slave devices that are in Bluetooth-discoverable range with the Bluetooth master device. The master device is advantageously a computer, but could also be a smartphone or a tablet, and preferably is any Bluetooth device having a display. The slave devices advantageously include a plurality of the following types of wireless, mobile devices: bar code scanners, telephones, tablets, personal digital assistants, radios, media players, headsets, laptops, computer mice, printers, modems, watches, pairs of glasses, and like mobile devices. The slave devices in the group may all be of the same type, or of different types. Each device has the above-described Bluetooth controller or programmed microprocessor. This disclosure is directed to enhancing the user experience in pairing the selected slave device, also known as a target slave device, and pairing the target slave device with the master device in an easy, simple, convenient, less error-prone, rapid, and automated manner.

The method is performed by having the master device establish unauthenticated communications with the slave devices. Each unauthenticated communication contains a Bluetooth device address, also known as a master address, of the master device. The method is further performed by having the slave devices receive the master address from the master device. Thereupon, a user manually performs a manual action with the selected slave device. The selected slave device then automatically initiates a pairing request, in response to the manual action, and communicates with the master device at the received master address. Thus, it is the selected slave device that automatically initiates the pairing request. It is no longer necessary, as in the prior art described above, to, among other things, look up names/serial numbers and find matching names/serial numbers in a long list displayed on a screen of the master device.

Advantageously, the method includes having the master device discover, prior to establishing the unauthenticated communications, all the slave devices that are in the range, in response to the user manually performing an action on the master device; creating a list of the discovered slave devices; and sorting and filtering the list to shorten the list to include only the slave devices that satisfy a predetermined criterion. Also, in a preferred embodiment, the establishing of the unauthenticated communications is made by an asynchronous connection-oriented link or connection (ACL). Verification data is optionally exchanged between the master device and the slave devices to verify each ACL connection. In addition, the method includes having the slave devices indicate that the master address has indeed been received and memorized and/or stored, and that the slave devices are thus ready for pairing. In response to the user action with the selected slave device, the master device may discontinue the establishing of the unauthenticated communications to all the other slave devices, and accept the pairing request from the selected slave device, and complete the pairing with the selected slave device.

Another aspect of this disclosure relates to a system for pairing a Bluetooth master device with a Bluetooth slave device that is selected from a group of Bluetooth slave devices that are in Bluetooth-discoverable range with the Bluetooth master device. The system includes a master controller in the master device for establishing unauthenticated communications between the master device and the slave devices, each unauthenticated communication containing a Bluetooth device address of the master device; and a slave controller in each slave device for receiving the Bluetooth device address in each slave device from the master device. The slave controller in the selected slave device is operative for detecting a manual action manually performed with the selected slave device by a user. Also, the slave controller in the selected slave device is operative for initiating a pairing request in response to the manual action, and for communicating with the master controller in the master device at the received Bluetooth device address.

Turning now to FIG. 1 of the drawings, reference numeral 10 generally identifies a Bluetooth network comprising a Bluetooth master device 20 depicted herein as a laptop computer, but could equally be any computer, smartphone or tablet, and preferably any Bluetooth-enabled device having a display screen 22; and a group of Bluetooth, slave devices, such as bar code scanners, telephones, tablets, personal digital assistants, radios, media players, headsets, laptops, computer mice, printers, modems, watches, pairs of glasses, and like wireless, mobile devices. The master device 20 and each slave device have an individual hardware-implemented, Bluetooth controller or programmed microprocessor, as described above, connected to an antenna to transmit or receive radio waves in the Bluetooth ISM band of frequencies.

As illustrated in FIG. 1 by way of non-limiting example, the slave devices are of various types and include bar code scanner 1, bar code scanner 2, bar code scanner 3, bar code scanner 4, bar code scanner 5, phone 6, headset 7, laptop 8, and computer mouse 9. The scanner 5 has been designated as a target scanner, because, as will be described below, this is the slave device that will be selected by a user from the group of all the slave devices for pairing with the master device 20. Thus, the slave devices in the group may all be of different types, as illustrated, or all of the same type. The number of devices of each type need not be as illustrated, but could be any number, especially a multitude of slave devices.

As also depicted in FIG. 1, a user 30 starts the pairing process at the master device 20 by performing a first manual action, e.g., pressing a dedicated button or key on a keyboard, or an icon (as illustrated) on the display screen 22, of the master device 20. The master controller in the master device 20 recognizes this first action and, in response, performs a Bluetooth discovery procedure, and creates a list of all the slave devices that are in the Bluetooth-discoverable communication range of the master device 20, and that are therefore visible to the master device 20.

The master controller in the master device 20 advantageously automatically sorts and/or filters the list to generate a shortened list 24 (see FIG. 1) that includes only the slave devices that satisfy a predetermined criterion. For example, filtering can be based on a specific type of slave device (e.g., only scanners, or only phones), or on supported services (e.g., only human interface device (HID)/serial port profile (SPP) supported services), or on device names (e.g., same prefixes), or on manufacturer-specific data, etc. Ordering can be based on, for example, a received signal strength indication (RSSI), or on the order in which the slave devices were discovered and found, etc. The shortened list 24 is a subset of all the slave devices.

Next, the master controller in the master device 20 automatically starts establishing unauthenticated communications with asynchronous connection-oriented links or connections (ACL) 26 (see FIGS. 1-2) with all the slave devices on the shortened list 24. Each unauthenticated communication contains a Bluetooth device address, also known as a master address, of the master device 20. Various approaches can be used. In one embodiment, an ACL connection 26 can be established and disconnected, one by one for the slave devices. In another embodiment, an ACL connection 26 can be established and maintained with up to seven slave devices. In still another embodiment, an ACL connection 26 can be established with the first six devices on the shortened list 24, followed by disconnecting the first slave device and simultaneously connecting the seventh slave device, and so on, in a so-called sliding window process. Verification data can be exchanged between the master controller in the master device 20 and the slave controller in each slave device to verify each ACL connection 26.

Figure 2:
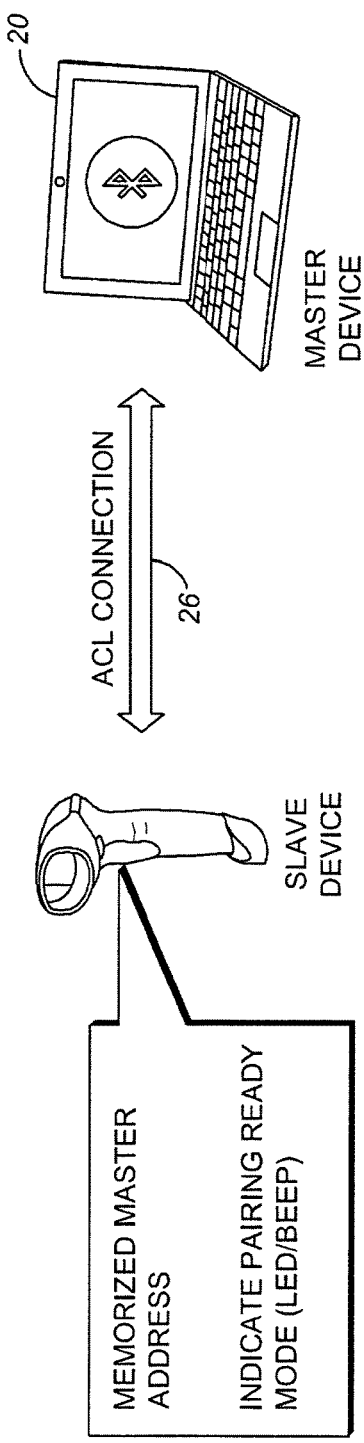
FIG. 2 is a diagrammatic view of a representative slave device and the master device of FIG. 1 during one step in the pairing.

As shown in FIG. 2, the slave controller in each slave device receives the Bluetooth device address from the master device 20 over the ACL connection 26, and memorizes and/or stores the Bluetooth device address in each slave device. The slave controller in each slave device can then indicate that the Bluetooth device address has been received and memorized and/or stored, and that each such slave device is ready for pairing, by, for example, illuminating a light emitting diode (LED) on the slave device, or sounding a beep from a speaker, beeper, etc. on the slave device.

Figure 3:
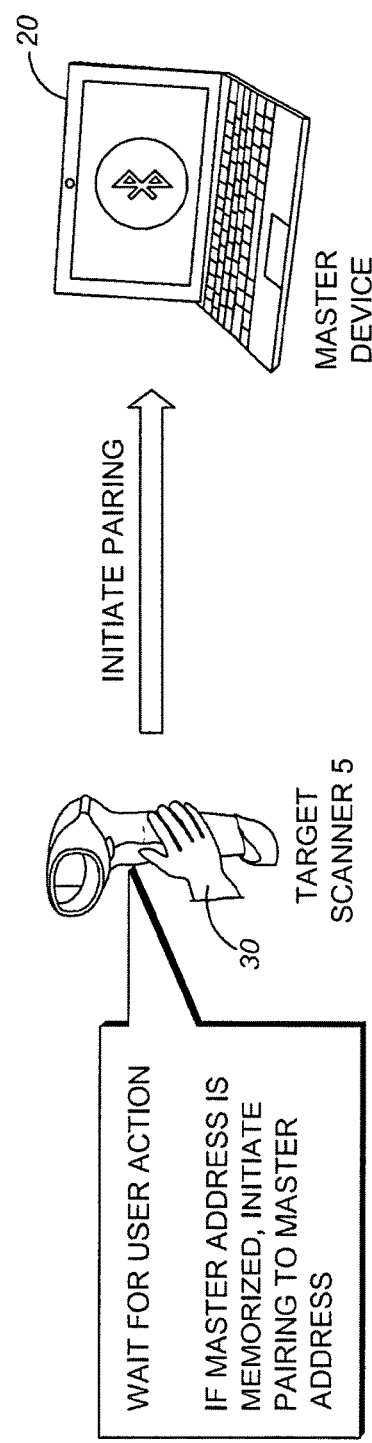
FIG. 3 is a diagrammatic view of the selected slave device and the master device of FIG. 1 during another step in the pairing.

As shown in FIG. 3, the user 30 selects one of the slave devices to be paired from the group. As previously mentioned, this is the target scanner 5 in the illustrated example. Then, the user 30 manually performs a second action with the target scanner 5. This second action can be, for example, pulling a trigger on the target scanner 5, or pressing a button on the target scanner 5, or gripping the target scanner 5 by its handle, or shaking the target scanner 5, or scanning a specially configured bar code symbol, or any other predetermined manual action.

The slave controller in the target scanner 5 waits for, and recognizes, this second action and, in response to the second action, the slave controller in the target scanner 5 automatically initiates a pairing request by having the target scanner 5 communicate with the master device 20 at the memorized Bluetooth device address. The master controller in the master device 20 automatically accepts the pairing request from the target scanner 5, completes the pairing with the target scanner 5, and automatically discontinues the establishing of the unauthenticated communications with all the other slave devices.

Thus, the pairing method is initiated with the slave device selected by the user 30, with minimal user interaction. The user experience is enhanced, because, among other things, there are no names/serial numbers to look up, and no names/serial numbers in a long list to be found and matched. The disclosed pairing process is simple, easy, less error-prone, convenient and rapid.

Figure 4:
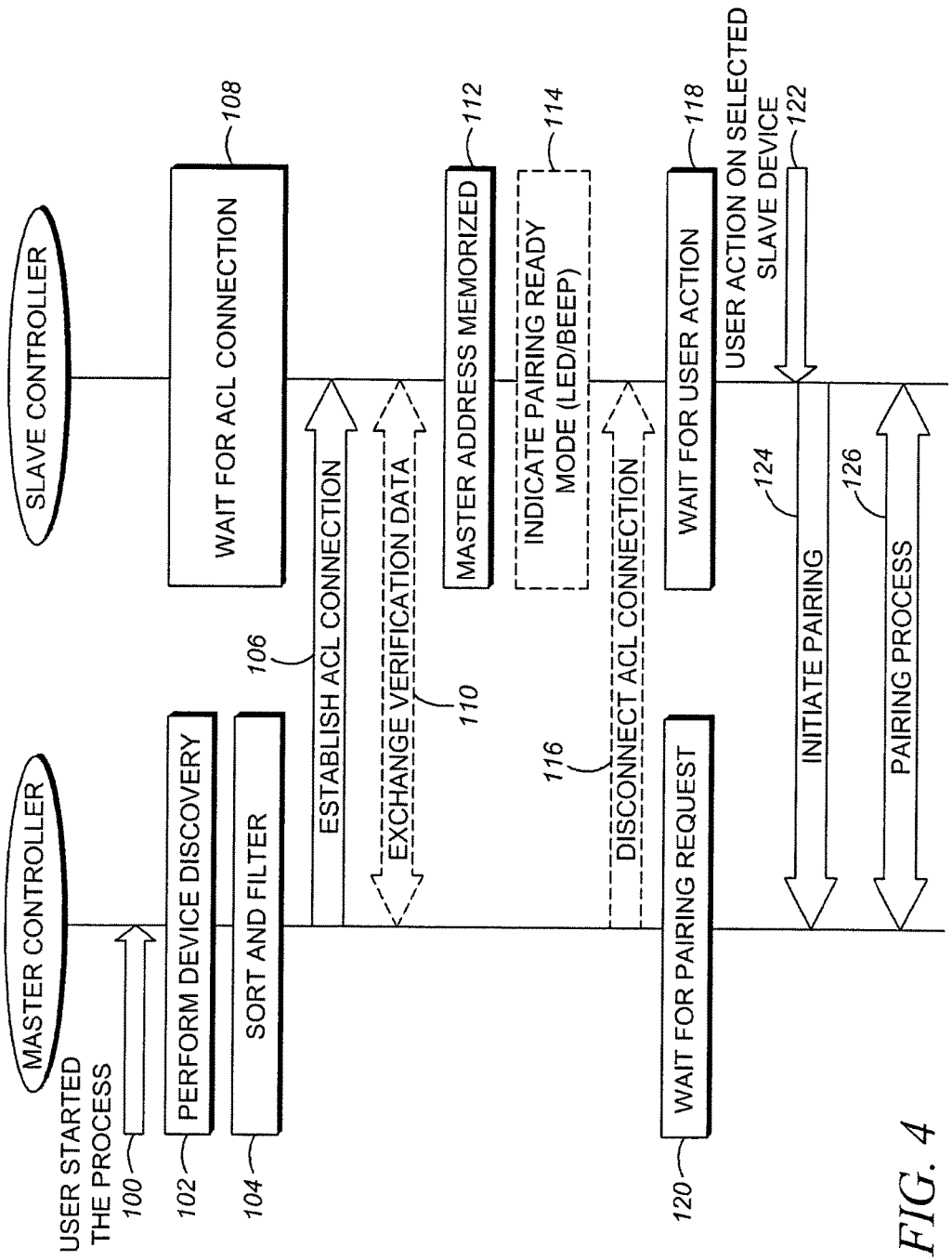
FIG. 4 is a sequence chart depicting steps performed by the slave devices and the master device of FIG. 1 in accordance with the method of the present disclosure.

The sequence chart of FIG. 4 depicts the order of the steps performed by the master controller in the master device 20 and by each slave controller in the slave devices during the process of pairing the master device 20 with the selected slave device. The process starts with the user manually performing a first manual action on the master device 20 at step 100. At step 102, in response to detecting the first manual action, the master controller automatically discovers all the slave devices that are in the range of the master device 20, and automatically creates a list of the discovered slave devices. At step 104, the master controller automatically sorts and filters the list to shorten the list to include only the slave devices that satisfy a predetermined criterion. At step 106, the master controller automatically establishes with the slave controllers unauthenticated communications with ACL connections 26 between the master device and the slave devices. Each unauthenticated communication contains a Bluetooth device address of the master device, i.e., a master address. Prior to establishing each ACL connection 26, each slave controller is waiting for an ACL connection 26, as depicted at step 108. At an optional step 110, verification data may be automatically exchanged between the master controller and the slave controllers to verify the ACL connections.

At step 112, the slave controllers have already received and memorized and/or stored the master address. At step 114, the slave controllers may optionally indicate that the master address has been received and memorized, and are ready for pairing, by illuminating an LED on the slave device, or sounding a beep. At this stage, the master controller may optionally discontinue the establishing of the unauthenticated communications at step 116, or this step may be performed subsequently, as described below.

At step 118, the slave controllers are waiting for the user to perform an action and, at step 120, the master controller is also waiting to receive a pairing request. At step 122, the wait has ended, because the user has manually performed a second manual action with the selected slave device, e.g., the target scanner 5. The slave controller in the selected slave device recognizes this second manual action, and automatically initiates a pairing request, and communicates with the master device at the received Bluetooth device address at step 124. The master controller accepts the pairing request from the selected slave device, and completes the pairing with the selected slave device at step 126. The above-described optional step 116 may also be performed in response to the second manual action after step 124.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of pairing a Bluetooth master device with a Bluetooth slave device that is selected from a group of Bluetooth slave devices that are in Bluetooth-discoverable range with the Bluetooth master device, comprising:
   the master device discovering all the slave devices that are in the range, in response to a user manually performing a first manual action on the master device;
   the master device creating a list of the discovered slave devices;
   the master device sorting and filtering the list to shorten the list to include only the slave devices that satisfy a predetermined criterion;
   the master device establishing with the slave devices unauthenticated communications with asynchronous connection-oriented link (ACL) connections between the master device and the slave devices, each unauthenticated communication containing a Bluetooth device address of the master device;
   exchanging verification data between the master device and the slave devices to verify the ACL connections;
   the slave devices receiving the Bluetooth device address from the master device, and memorizing the Bluetooth device address;
   the slave devices indicating that the Bluetooth device address has been received and memorized, and are ready for pairing;
   the selected slave device recognizing a second manual action manually performed with the selected slave device by the user; and
   the master device discontinuing the establishing of the unauthenticated communications in response to the second manual action; the selected slave device initiating a pairing request, in response to the second manual action, and communicating with the master device at the received Bluetooth device address; and
   the master device accepting the pairing request from the selected slave device.

2. A system for pairing a Bluetooth master device with a Bluetooth slave device that is selected from a group of Bluetooth slave devices that are in Bluetooth-discoverable range with the Bluetooth master device, comprising:
   a master controller in the master device for establishing unauthenticated communications between the master device and the slave devices, each unauthenticated communication containing a Bluetooth device address of the master device, wherein the master controller is operative for discovering, prior to establishing the unauthenticated communications, all the slave devices that are in the range, in response to a user manually performing a first manual action on the master device;

a slave controller in each slave device for receiving the Bluetooth device address in each slave device from the master device;

wherein, the slave controller in the selected slave device is operative for:

detecting a second manual action manually performed with the selected slave device by the user, initiating a pairing request in response to detecting the manual action, and for communicating with the master controller in the master device at the received Bluetooth device address, and the master controller is operative for:

discontinuing the establishing of the unauthenticated communications in response to the second manual action performed with the selected slave device, and for accepting the pairing request from the slave controller in the selected slave device.

3. The system of claim 2, wherein the master controller is further operative for creating a list of the discovered slave devices.

4. The system of claim 3, wherein the master controller is further operative for sorting and filtering the list to shorten the list to include only the slave devices that satisfy a predetermined criterion.

5. The system of claim 2, wherein the master controller is further operative for establishing the unauthenticated communications by an asynchronous connection-oriented link (ACL) connection, and wherein the master controller and each slave controller are together operative for exchanging verification data between the master device and the slave devices to verify each ACL connection.

6. The system of claim 2, wherein the slave controller in each slave device is further operative for indicating that the Bluetooth device address has been received, and that the slave devices are ready for pairing.

7. The system of claim 2, wherein the slave devices include a plurality of mobile, wireless devices selected from the group consisting of: bar code scanners, telephones, tablets, personal digital assistants, radios, media players, headsets, laptops, computer mice, printers, modems, watches, and pairs of glasses.

8. The system of claim 2, wherein the master device is a computer having a display screen and manual inputs.

* * * * *